Babinec et al.

[11] Patent Number: 4,867,909
[45] Date of Patent: * Sep. 19, 1989

[54] NOVEL CATALYTIC ELECTRICALLY CODUCTING POLYMERIC ARTICLES

[75] Inventors: Susan J. Babinec; Greg K. Rickle, both of Midland, Mich.

[73] Assignee: Dow Chemical Company, Midland, Mich.

[*] Notice: The portion of the term of this patent subsequent to Nov. 11, 2003 has been disclaimed.

[21] Appl. No.: 751,107

[22] Filed: Jul. 2, 1985

[51] Int. Cl.$^4$ ............................................. H01B 1/06
[52] U.S. Cl. ................... 252/518; 252/500; 252/519; 429/213; 204/291; 204/292
[58] Field of Search ............... 252/500, 512, 518, 519; 528/422; 204/291292; 429/213, 212, 40, 42, 44

[56] References Cited

U.S. PATENT DOCUMENTS

| | | | |
|---|---|---|---|
| 3,751,301 | 8/1973 | Kilduff | 136/26 |
| 3,867,315 | 2/1975 | Tigner et al. | 252/512 |
| 4,118,294 | 10/1978 | Pellegri | 204/129 |
| 4,287,032 | 9/1981 | Pellegri | 204/128 |
| 4,402,906 | 9/1983 | Ueda et al. | 420/493 |
| 4,440,693 | 4/1984 | Naarmann et al. | 260/439 R |
| 4,519,938 | 5/1985 | Papir | 252/500 |
| 4,522,745 | 6/1985 | Kurkor | 252/500 |
| 4,622,169 | 11/1986 | Rickle | 252/500 |

FOREIGN PATENT DOCUMENTS 2096641 10/1982 United Kingdom .

OTHER PUBLICATIONS

Journal of the Electrochemical Society, "Electrochemically Modified Electrodes," Minh-Chau Pham, Jacques-Emile Dubois and Pierre-Camille Lacaze (Feb. 1983), pp. 346–351.

ACS Symposium Series 192, "Chemically Modified Surfaces in Catalysis and Electrocatalysis", Joel S. Miller, Editor, pp. 65–70.

*Primary Examiner*—Josephine Barr
*Attorney, Agent, or Firm*—Randall A. Davis

[57] ABSTRACT

The invention is an article comprising at least partially a catalytic, metal-containing, electrically conducting coordination polymer. In addition, this invention includes a process of manufacturing the article comprising applying a mixture containing a catalytic, metal-containing, electrically conducting coordination polymer to a substrate and drying said fluid to form a coating. This invention also encompasses an electrolytic cell comprising a cell body and a cathode spaced apart from an anode, said anode comprising a catalytic, metal-containing, electrically conducting coordination polymer. Another aspect of this invention is a process for generating reduction-oxidation reaction products comprising electrolyzing a solution in the above described electrolytic cell.

12 Claims, No Drawings

NOVEL CATALYTIC ELECTRICALLY CODUCTING POLYMERIC ARTICLES

BACKGROUND OF THE INVENTION

This invention relates to articles, and more particularly to electrodes suitable for use in electrolytic cells, at least partially composed of a catalytic, metal-containing, electrically conducting coordination polymer.

Electrodes for use in electrochemical cells must generally meet a combination of strict requirements with regard to conductivity, physical and chemical stability, corrosion resistance, manufacture and electrochemical performance, and more particularly, catalytic activity and selectivity.

Various efforts have been made to produce catalytic electrically conducting polymeric materials for use in articles such as electrodes. Incorporation of metals, metallic salts and metal complexes into polymers and resins to impart stability and/or conductivity is well known. These resins or polymers are used as a matrix for anchoring the redox center in a three-dimensional zone.

The state of the art with regard to electrocatalytic polymeric materials, and more specifically their use in electrodes, may be illustrated by the following examples. Tigner describes in U.S. Pat. No. 3,867,315 an electrode containing a resinous composition comprising nonconducting or semiconducting thermosetting resinous material wherein the matrix of the composition has dispersed therein a finely divided, copper metal-containing solid and a salt, said salt and copper metal-containing solid being present in amounts sufficient to render the composition electroconductive. U.S. Pat. Nos. 3,751,301 and 4,118,294 further describe other electrodes comprising powdered (or particulate) conductive material interspersed in a cured thermosetting resin. U.S. Pat. Nos. 4,287,032 and 4,402,906 and Great Britain Pat. No. 2,096,614A describe electrodes consisting of an electroconductive, electrocatalytic material finely dispersed in an insoluble semiconducting polymer network. Another type of electrode is described in U.S. Pat. No. 4,440,693 in which bis(diphenyl-glyoximate)Ni (II) complexes, which have planar structures and crystallize in stacks, are converted by oxidation with iodine into an electrically conductive compound bis-(diphenyl-glyoximate)-Ni. I.

Major problems associated with catalytic polymeric materials have been (1) loss of activity with time caused by the leaching of metal ions, and (2) inability to use thicker catalyst coatings due to increased electrical resistance.

SUMMARY OF THE INVENTION

The present invention is an article at least partially containing a catalytic, metal-containing, electrically conducting coordination polymer.

Another aspect of the invention is a process for manufacturing an electrode comprising applying a liquid containing a catalytic, metal-containing, electrically conducting coordination polymer to an electrically conducting substrate; and evaporating the liquid to form a coating adhering to at least a surface portion of said substrate.

A third aspect of this invention is an electrolytic cell comprising a cell body and a cathode spaced apart from an anode, said anode comprising a catalytic, metal-containing, electrically conducting coordination polymer.

A fourth aspect of this invention is a process for generating reduction-oxidation reaction products comprising electrolyzing a solution in an electrolytic cell containing at least an anode and a cathode, said anode comprising a catalytic, metal-containing, electrically conducting coordination polymer.

DETAILED DESCRIPTION

Articles at least partially composed of a catalytic compound metal-containing, electrically conducting coordination polymer are unique in that the polymers are homogeneous compounds. They are catalytic and intrinsically electrically conducting (i.e., no doping), and they strongly bond the incorporated metals.

Many coordination complexes of various metal ions are known; these generally consist of a central metal atom or ion surrounded by a coordination sphere of neutral atoms, neutral molecules, or ions. The atoms, molecules or ions surrounding the central metal are referred to as ligands. The coordination number (i.e., the number of nearest neighboring groups to the central metal) may vary from metal to metal. Generally, these coordination complexes are monomeric, but selection of groups possessing properly disposed ligands may lead to coordination polymers.

The articles may be composed entirely or partially of a catalytic, metal-containing, electrically conducting coordination polymer.

According to the method of the present invention, predetermined amounts of the coordination polymer in a uniformly dispersed liquid may be advantageously applied to a substrate. Multiple layers may be coated on the substrate to provide any desired thickness or surface loading. Preferably, the catalytic, metal-containing, electrically conducting coordination polymer is coated onto a surface suitable for electrolysis. Preferred substrates are those which are electrically conductive. More preferred substrates are carbon, graphite, platinum and gold. Most preferred substrate is graphite. These metals are preferred substrates due to their relative stability to oxidation.

A catalytic amount of coordination polymer may be coated on a substrate and then the article is preferably used as an electrode. The preferred range is a thickness greater than about 50 Å. The more preferred range is about $50-10^5$ Å. The most preferred thickness is about $10^3$ Å.

The catalytic, metal-containing, electrically conducting coordination polymer may be coated onto an article by any coating method which doesn't destroy the polymeric structure. For example, the coordination polymer may be mixed in a solution or suspended in a slurry and the article painted with or dipped into said solution of slurry followed by solvent removal. The polymer may be deposited by absorption. A preferred method of coating an article, and more specifically an electrode, is accomplished by applying a mixture containing a catalytic metal-containing, electrically conducting coordination polymer to an electrically conducting substrate. A more preferred method is painting a suspension of said coordination polymer on the substrate or by dipping the substrate in a coordination polymer suspension thereby coating said substrate.

Other materials may be uniformly incorporated in the coating to provide given properties, e.g. to further improve conductivity and/or catalytic activity of the coating, to bind the polymeric coating to the substrate, to improve physical and chemical stability of the compound. Preferred materials include polymeric binders. More preferred materials is polymethylmethacrylate.

The method of solvent removal after coating an article with the catalytic, metal-containing, electrically conducting coordination polymer can be accomplished by any method so long as the polymeric coating adheres to the article. A preferred method of solvent removal is accomplished by air drying. A more preferred method is drying said polymeric coating in a vacuum oven.

Metals useful in this invention are those metals which catalyze chemical reactions. Preferred metals are copper, silver, nickel, gold, cobalt, platinum and palladium. More preferred metals are copper, nickel, silver and cobalt. The most preferred metal is copper due to its high electrical conductivity.

In a preferred embodiment, the polymer is the reaction product of
(a) an anthraquinone or naphthaquinone;
(b) a copper, nickel, silver or cobalt salt; and
(c) oxygen.

The oxygen can be present as pure oxygen, or as an oxygen-containing gas such as air. Generally, a sufficient amount of oxygen to give an electrically conducting complex is used.

The coordination polymer comprises anthraquinone or naphthaquinone and metal units. These coordination polymers are electrically conductive, and stable in air and in water. In one preferred embodiment, the polymer consists of alternating anthraquinone or naphthaquinone and dioxodimetal units. The coordination polymers generally have conductivities of between about 0.0001 and about 30 Siemens/cm.

In a more preferred embodiment, the polymers of this invention generally correspond to the following structure;

wherein Me represents a metal, a is separately in each occurrence an integer of from about 2 to about 4 and n is an integer of from about 1 to about 10.

In a most preferred embodiment, the polymer is an oxidation product of 1,4-diamino anthraquinone and copper (I) chloride. This polymer consists of alternating 1,4-diamino anthraquinone and dioxodicopper units. The polymers derived from 1,4-diamino anthraquinone and copper (I) chloride preferably have an empirical formula of $C_{14}H_{10}N_2O_3 \cdot 4Cu_{1-2}$.

Anthraquinones useful in this invention include those which are substituted with at least one primary amino group, which may be further substituted with at least one substituent of hydroxy, amino or mercapto wherein the first amino group and one of the groups comprising hydroxy, amino or mercapto are on nonadjacent carbon atoms. The anthraquinones useful in this invention may contain more than one amino group and more than one hydroxy or mercapto group.

Naphthaquinones useful in this invention include naphthaquinones which are substitued by at least one amino group, and at least one of the following hydroxy, amino or mercapto groups, wherein the amino and the hydroxy, amino or mercapto groups are on nonadjacent carbon atoms. The naphthaquinone may be substituted with more than one amino group, hydroxy or mercapto group or mixtures thereof. However, the presence of substituents generally result in the reduction of the conductivity of the complexes prepared.

Articles coated according to this invention may be used advantageously as electrodes in an electrolytic cell comprising a cell body and a cathode spaced apart from said anode. A more preferred use of the article would be as an anode.

Reduction-oxidation reaction products may be generated in an electrolytic cell by using an anode partially composed of a catalytic metal-containing, electrically conducting coordination polymer. A preferred method is the production of ethylene dichloride by passing an

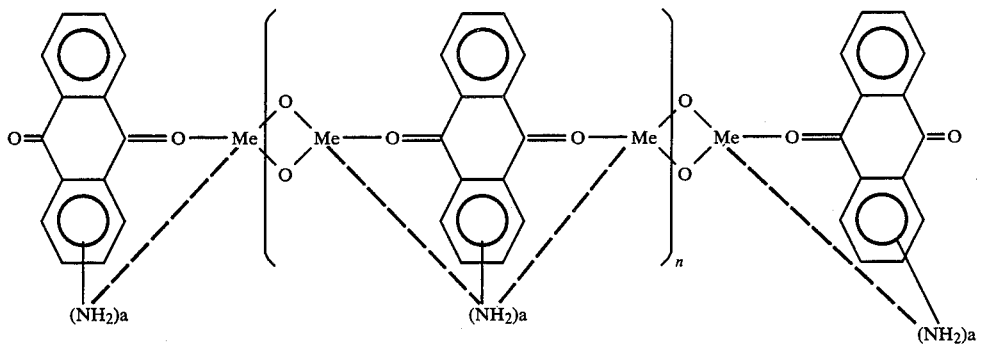

or

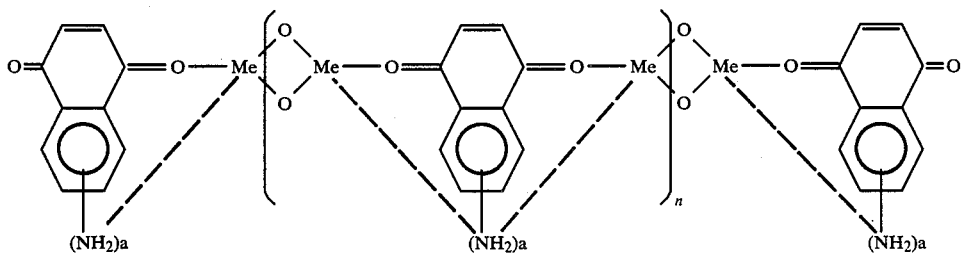

electric current through the above described electrolytic cell which additionally contains an ethylene saturated NaCl aqueous solution as the electrolyte.

SPECIFIC EMBODIMENT

The following examples are included for illustrative purposes only and do not limit the scope of the invention or the claims.

EXAMPLE 1

A semiconducting polymeric coating is prepared by suspending poly ($\mu_2$-dioxodicopper) diamino anthraquinone (DAAQ) in dimethyl formamide (DMF) —0.0414 g DAAQ/g DMF, brushing successive layers of said mixture on a graphite electrode and drying each layer in a vacuum oven at about 30° C. for about one-half hour to remove the solvent. A loading of $2.9 \times 10^{-5}$ moles/cm$^2$ of said DAAQ derivative is applied to the electrode. The electrode is then placed as an anode in an electrolytic cell which contains an ethylene saturated aqueous sodium chloride solution (5.0M NaCl, $10^{-3}$M HCl) as the electrolyte. An electric current is passed through the cell, thereby producing ethylene dichloride (EDC). The results are compiled in Table I.

TABLE I

| Hours Electrode Soaked In Electrolyte | $Cu^{++}$ (mole/cm$^2$) | Coulombs of Current Passed | Coulomb Equivalents of EDC Produced | Current Efficency % |
|---|---|---|---|---|
| 0 | $2.9 \times 10^{-5}$ | 6.9 | 4.071 | 59 |
| 24 | $1.9 \times 10^{-5}$ | 5.2 | 1.56 | 30 |
| 72 | $1.5 \times 10^{-5}$ | 3.2 | 1.824 | 57 |
| 120 | $1.1 \times 10^{-5}$ | 2.3 | 0.736 | 32 |
| 188 | $1.1 \times 10^{-5}$ | 2.7 | 0.594 | 22 |
| 528 | $4.9 \times 10^{-6}$ | 1.0 | 0.2 | 20 |

The current efficiency equals the coulomb equivalents of EDC produced divided by the coulombus of electricity passed through the cell. Coulomb equivalents is defined as the number of coulombs used to produce the amount of ethylene dichloride generated in the cell and is calculated by the following formula:

$$\text{Coulomb Equiv.} = X_{moles\ EDC} \left( \frac{2\ \text{equiv.}}{1\ \text{mole}} \right) \left( \frac{96{,}473\ \text{coulombs}}{1\ \text{equiv.}} \right)$$

wherein X equals the number of moles of ethylene dichloride generated in the cell. The electrodes performs satisfactorily even though there is some loss of activity due to poor polymeric adhesion to the graphite substrate.

EXAMPLE 2

A second anode is prepared substantially in accordance with the procedure in Example 1. This anode has a surface loading of about $8.9 \times 10^{-6}$ moles/cm$^2$ and a total surface area of about 3.8 cm$^2$. Said anode is placed in a brine solution (25 ml) and allowed to soak. The results are compiled in Table II.

TABLE II

| Hours | $Cu^{++}$ leached (ppm) |
|---|---|
| 1 | 2 |
| 5 | 5 |
| 25 | 8 |

TABLE II-continued

| Hours | $Cu^{++}$ leached (ppm) |
|---|---|
| 240 | 12 |

The purpose of soaking the electrode in brine solution is to determine the amount of $Cu^{++}$ loss due to leaching of said Cu ion. The results show that this electrode will perform satisfactorily for a long period since only a minute amount of Cu ion is leached into the brine solution.

EXAMPLE 3

An electrode, prepared substantially in accordance with the procedure in Example 1, is used as an anode in a pressurized fuel cell. The current collectors are composed of a ruthenium titanium oxide, the anolyte and catholyte and brine and the cathode is nitric acid treated graphite felt pads. The graphite felt pads are prepared by soaking Union Carbide #3000 VDF carbon felt pads (0.244" thick, 4"diameter) in concentrated $HNO_3$ for 24 hours and then gently refluxing for 4 hours in concentrated $HNO_3$. Then, said pads are rinsed with distilled water until the pH of the rinse water measured neutral. The pads are dried in an oven for 24 hours at 100° C. The cross sectional area of the anodes is 10 in$^2$. Pressure, temperature and external resistance are varied in the cell and the results are compiled in Table III.

TABLE III

| External Resistance (ohms) | Cell Volts | | |
|---|---|---|---|
| | 45 psia 75° C. | 75 psia 75° C. | 75 psia 105° C. |
| 1 | 0.323 | 0.286 | 0.312 |
| 10 | 0.435 | 0.416 | 0.525 |
| 100 | 0.495 | 0.477 | 0.614 |
| 1,000 | 0.522 | 0.512 | 0.634 |
| 10,000 | 0.536 | 0.536 | 0.645 |
| 100,000 | 0.555 | 0.540 | 0.654 |
| 1,000,000 | 0.566 | 0.556 | 0.664 |

The current produced in calculated by dividing the cell volts by the cell resistance. Current density is obtained by dividing the cell current by the cross-sectional area (10 in$^2$). In the above example, the current density at 75 psia, 105° C. and 1 ohm of resistance is 31.2 (ma/in$^2$). The poly ($\mu_2$-dioxodicopper) DAAQ coated anode impressively demonstrates high voltage and high current in the pressurized fuel cell.

What is claimed is:

1. An electrode containing a catalytic, metal-containing, electrically conducting coordination polymer, the polymer being a reaction product of (a) an anthraquinone or a naphthaquinone; (b) salt of a catalytic metal; and (c) oxygen.

2. The electrode of claim 1 wherein the polymer has an electrical conductivity of about 0.0001 to about 30 S/cm (Siemens per centimeter) and comprises the reaction product of
    (a) a compound selected from the group consisting of anthraquinone or naphthaquinone substituted with at least one primary amino group and at least one substituent selected from the group consisting of a second primary amino group, a hydroxy group and a mercapto group on nonadjacent carbon atoms; and (b) a salt of a catalytic metal selected from the group consisting of copper, silver, nickel, gold, cobalt, platinum or palladium.

3. The electrode of claim 2 wherein the polymer additionally contains oxygen.

4. The electrode of claim 3 wherein the polymer has a structure of alternating units of

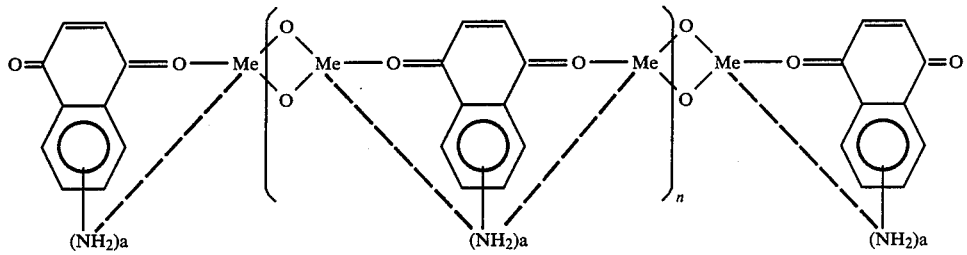

(a) anthraquinone or naphthaquinone; and
(b) $\mu_2$ dioxo-dimetal.

5. The electrode of claim 4 wherein the metal is selected from the group consisting of copper, silver, nickel, gold, cobalt, platinum and palladium.

6. The electrode of claim 4 wherein the metal is selected from the group consisting of copper, nickel, silver and cobalt.

7. The electrode of claim 4 wherein the metal is selected from the group consisting of copper, nickel or silver.

8. The electrode of claim 4 wherein the metal is copper.

9. The electrode of claim 2 wherein the polymer corresponds to the structure

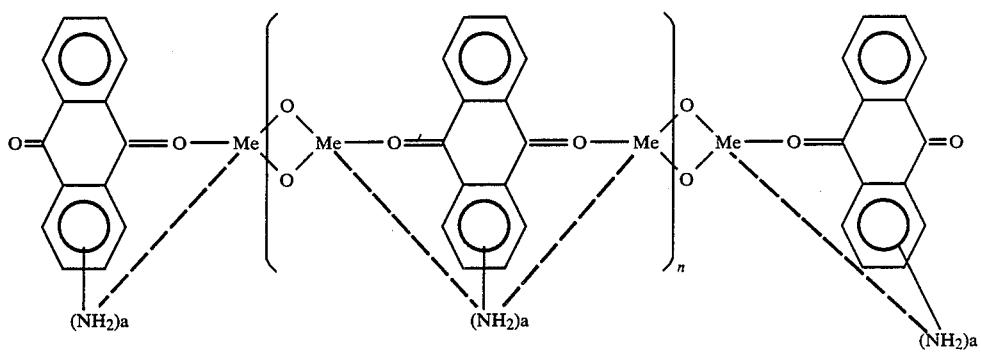

wherein a is separately in each occurrence an integer of from about 2 to about 4; Me is the catalytic metal; and n is an integer of from about 1 to about 10.

10. The electrode of claim 2 wherein the polymer corresponds to the structure wherein a is separately in each occurrence an integer of from about 2 to about 4; Me is the catalytic metal; and n is an integer of from about 1 to about 10.

11. The article of claim 10 wherein the metal is copper.

12. The article of claim 11 wherein a equals 2.

* * * * *